United States Patent [19]

Maekawa et al.

[11] Patent Number: 5,118,575
[45] Date of Patent: Jun. 2, 1992

[54] PLATE-LIKE COMPOSITE FERRITE FINE PARTICLES FOR MAGNETIC RECORDING AND A PROCESS FOR PRODUCING THE SAME

[75] Inventors: Masaaki Maekawa; Norio Sugita, both of Hiroshima, Japan

[73] Assignee: Toda Kogyo Corp., Hiroshima, Japan

[21] Appl. No.: 566,036

[22] Filed: Aug. 13, 1990

Related U.S. Application Data

[63] Continuation-in-part of Ser. No. 427,338, Oct. 27, 1989, abandoned.

[30] Foreign Application Priority Data

Apr. 22, 1989 [JP] Japan .................................. 1-102580

[51] Int. Cl.$^5$ ............................................. C04B 35/26
[52] U.S. Cl. .................................. 428/403; 252/62.59; 252/62.62; 252/62.63; 427/127
[58] Field of Search ............... 252/62.56, 62.59, 62.62, 252/62.63; 428/403; 427/127

[56] References Cited

U.S. PATENT DOCUMENTS 4,752,407  6/1988  Nagai et al. ..................... 252/62.59
4,770,933  7/1988  Kitahata et al. ..................... 428/323

FOREIGN PATENT DOCUMENTS 0272148  4/1988  European Pat. Off. .
63-2812  1/1988  Japan .................................. 252/62.63

*Primary Examiner*—Jack Cooper
*Attorney, Agent, or Firm*—Nixon & Vanderhye

[57] ABSTRACT

Disclosed herein are plate-like composite Ba-containing ferrite fine particles for magnetic recording, containing Ni, Co and Ti in the molar ratios defined by $0.02 \leq Ni/Fe \leq 0.10$, $0.01 \leq Co/Fe \leq 0.10$ and $0.01 \leq Ti/Fe \leq 0.10$, but $0.03 \leq (Ni+Co)/Fe \leq 0.14$ and $Ti/(Ni+Co) < 1$, and having zinc in the vicinity of the particle surface in the form of solid solution, and a temperature dependence of coercive force of said particles in the range of $-0.5$ to $+2.0$ Oe/°C. in the temperature range of $-20°$ to $120°$ C., and a process for producing the same.

6 Claims, No Drawings ly as small a particle size as possible, a large magnetization, an appropriate coercive force and an excellent temperature stability are now in the strongest demand.

PLATE-LIKE COMPOSITE FERRITE FINE PARTICLES FOR MAGNETIC RECORDING AND A PROCESS FOR PRODUCING THE SAME

CROSS-REFERENCE TO RELATED APPLICATION

The present application is a continuation-in-part of U.S. Application, Ser. No. 07/427,338 filed Oct. 27, 1989, now abandoned.

BACKGROUND OF THE INVENTION

The present invention relates to plate-like composite ferrite fine particles for magnetic recording having a large magnetization, an appropriate coersive force, a large anisotropy field and an excellent temperature dependence of the coercive force (temperature stability), and a process for producing such plate-like composite ferrite fine particles.

Recently, as described, for example, in Japanese Patent Application Laid-Open (KOKAI) No. 55-86103 (1980), ferromagnetic non-acicular particles have been demanded as a magnetic recording material, in particular, as a perpendicular magnetic recording material.

Generally, plate-like ferrite containing Ba particles are known as ferromagnetic non-acicular particles.

A method of autoclaving an aqueous alkaline suspension containing Ba ions or Sr ions and Fe(III) by using an autoclave as a reaction apparatus (this method is hereinafter referred to as "autoclaving method") is hitherto known as a process for producing plate-like ferrite.

Plate-like ferrite fine particles for magnetic recording are required to have as small a particle size as possible, to have an appropriate coercive force and a large magnetization as the magnetic properties, and to be so excellent in the temperature dependence of the coercive force (temperature stability). This will be explained in more detail in the following.

Firstly, the particle size of plate-like ferrite fine particles suitable for magnetic recording is required to be as fine as possible, in particular, to be not greater than 0.3 μm. This fact is described, for example, in Japanese Patent Application Laid-Open (KOKAI) No. 56-125219 (1981) "The utility of the perpendicular magnetic recording to longitudinal recording become manifest in the region in which the recording wavelength is not more than 1 μm. In order to sufficiently record and reproduce in this wavelength region, the crystalline particle diameter of the ferrite is preferably substantially not greater than 0.3 μm. However, if the particle diameter becomes smaller than about 0.01 μm, the desired coercive force tends to be not exhibited. Therefore, a crystalline particle diameter of 0.01 to 0.3 μm is appropriate".

Secondly, with respect to the magnetic properties, the plate-like ferrite containing Ba fine particles are generally required to have a coercive force of about 300 to 2,000 Oe, and in order to reduce the coercive force of the plate-like ferrite containing Ba particles produced in the autoclaving method to an appropriate coercive force, it has been proposed to substitute a part of $Fe^{3+}$ in the ferrite by Co(II), Ti(IV) or the ions of a divalent metal M(II) such as Mn and Zn.

The magnetization of plate-like ferrite containing Ba particles must be as large as possible, as is described in Japanese Patent Application Laid-Open (KOKAI) No. 56-149328 (1981), ". . . the magnetoplumbite ferrite which is used as a magnetic recording material is required to have the greatest possible saturation magnetization . . .".

The coercive force of plate-like ferrite containing Ba particles generally has a tendency of increasing with the rise of temperature, as is seen from FIG. 4 on page 1123 of IEEE TRANSACTIONS ON MAGNETICS MAG-18 No. 6. At the time of recording and reproduction, the temperatures of a magnetic head and a magnetic medium are raised with the reciprocal friction, so that the writing capacity for recording of the magnetic head is lowered, while the coercive force of the medium containing the plate-like ferrite containing Ba particles as magnetic particles is increased with the rise of temperature, resulting in the drop of output or deterioration of the overwrite characteristic. It is, therefore, necessary in order to enable record-writing in spite of the lowered writing capacity of the magnetic head that the coercive force of the medium scarcely varies or rather has a tendency to lower with the rise of temperature. Namely, it is necessary that the temperature dependence of the coercive force (hereinafter referred to as "temperature stability") of plate-like ferrite containing Ba particles is not more than 2.0 Oe/°C. at a temperature of −20° to 120° C.

Plate-like ferrite fine particles which have as small a particle size as possible, a large magnetization, an appropriate coercive force and an excellent temperature stability are now in the strongest demand. In the above-described autoclaving method, various kinds of ferrite particles precipitate depending on the selected reaction conditions. The precipitated particles ordinarily have a shape of a hexagonal plate, and the particle properties such as particle size distribution and average particle diameter, and the magnetic properties such as coercive force, magnetization and temperature stability are different depending upon the conditions under which the ferrite particles are produced.

For example, in plate-like composite Ba ferrite fine particles containing Co(II) - Ti(IV) obtained by autoclaving method while substituting a part of Fe(III) in the ferrite by Co(II) and $Ti^{4+}$ in order to reduce the coercive force to an appropriate coercive force and heat-treating the thus-obtained fine particles, the coercive force reducing-effect of Co(II) - Ti(IV) is large. As a result the necessary amount of Co(II) and Ti(IV) added to appropriately control the coercive force is so small as not to greatly lower the magnetization, which is maintained at a relatively large value such as about 50 to 60 emu/g. However, the temperature stability is +2.5 Oe/°C. to 6.0 Oe/°C. at a temperature of −20° to 120° C., and the coercive force of the plate-like composite Ba ferrite particles containing Co(II) and Ti(IV) has a tendency of increasing with the rise of temperature, as described above. This phenomenon is presumed from FIG. 1 on page 1459 of JOURNAL OF MAGNETISM AND MAGNETIC MATERIALS Nos. 15 to 18 (1980).

As a method of improving the temperature stability of plate-like composite ferrite fine particles containing elements such as Co(II) and Ti(IV) for reducing the coercive force, methods disclosed in, for example, Japanese Patent Application (KOKAI) Laid-Open Nos. 61-152003 (1986) and 62-132732 (1987) are conventionally known.

Japanese Patent Application (KOKAI) Laid-Open No. 61-152003 (1986) discloses a method of heat-treating the plate-like composite ferrite fine particles containing elements such as Co(II) and Ti(IV) for reducing the coercive force at a temperature of 300° to 700° C. in a reducing atmosphere. This method is disadvantageous in that the coercive force after heat-treating is increased to more than twice the value before heat-treating, thereby making the appropriate control of the coercive force difficult.

Japanese Patent Application (KOKAI) Laid-Open No. 62-132732 (1987) discloses a method of forming plate-like composite ferrite particles having uniform particle shape such that the average particle diameter is not more than 1.0 μm, the thickness in the direction of the c-axis is not more than 0.2 μm and a plate ratio (average diameter of plate surfaces/thickness in the direction of c-axis) is not less than 5. This method is disadvantageous in that the particle shape is regulated in order to improve the temperature stability.

Plate-like ferrite containing Ba particles are also required to have a large anisotropy field so as to enable high-density recording without lowering the output even in a high-frequency band. This fact is described, for example, on pages 67 to 68 of HIGH-DENSITY MEMORY TECHNIQUE AND MATERIALS (1984), published by K. K. CMC, "FIGS. 2, 3 and 12 show the characteristics between the output and the wave-length obtained by recording/reproducing with a ring head by using a Co-Cr single-layer medium having a large perpendicular anisotropy field (Hk). An excellent high-density recording characteristic such as $D_{50}=135$ KBPI is obtained ... ".

The establishment of a method of producing plate-like Ba ferrite fine particles having as small a particle size as possible, an appropriate coercive force, a large magnetization, a more large anisotropy field and an excellent temperature stability without any regulation in the particle shape has, therefore, been strongly demanded.

As a result of various studies on a process for producing plate-like composite Ba ferrite fine particles containing $Co^{2+}$ and $Ti^{4+}$, having as small a particle size as possible, an appropriate coercive force, a large magnetization, a more large anisotropy field and an excellent temperature stability that the coercive force scarcely varies with the rise of temperature without any regulation in the particle shape, it has been found that by autoclaving a suspension of an alkaline iron (III) hydroxide containing Ba ions as well as a Ni Compound, a Co compound and a Ti compound in molar ratios defined by $0.02 \leq Ni/Fe \leq 0.10$, $0.01 \leq Co/Fe \leq 0.10$ and $0.01 \leq Ti/Fe \leq 0.10$, in the range of but $0.03 \leq (Ni+Co)/Fe \leq 0.14$ and $Ti/(Ni+Co) < 1$, at a temperature of 90° to 300° C. to produce the plate-like composite Ba ferrite fine particles; suspending the thus obtained fine particles in an aqueous solution containing zinc and having a pH of 4.0 to 12.0; filtering out the fine particles with a Zn hydroxide precipitated on the surfaces thereof; and after washing with water and drying, calcining (heat-treating) the thus obtained particles in the temperature range of 600 to 900° C., the thus obtained plate-like composite Ba ferrite particles containing Ni, Co and Ti in the molar ratios defined by $0.02 \leq Ni/Fe \leq 0.10$, $0.01 \leq Co/Fe \leq 0.10$, and $0.01 \leq Ti/Fe \leq 0.10$, but $0.03 \leq (Ni+Co)/Fe \leq 0.14$ and $Ti/(Ni+Co) < 1$, and having a concentration gradient of Zn with 0.2 to 5 wt % (calculated as Zn) through the particle in the form of a solid solution, have an appropriate coercive force, a large magnetization, a large anisotopy field of not less than 4.0 KOe and a temperature stability of −0.5 Oe/°C. to +2.0 Oe/°C. in the temperature range of −20° C. to 120° C. The present invention has been achieved on the basis of this finding.

SUMMARY OF THE INVENTION

In a first aspect of the present invention, there is provided plate-like composite Ba-containing ferrite fine particles for magnetic recording, containing Ni, Co and Ti in the molar ratios defined by $0.02 \leq Ni/Fe \leq 0.10$, $0.01 \leq Co/Fe \leq 0.10$ and $0.01 \leq Ti/Fe \leq 0.10$, but $0.03 \leq (Ni+Co)/Fe \leq 0.14$ and $Ti/(Ni+Co) < 1$, having a concentration gradient of Zn with 0.2 to 5 wt % through the particle in the form of solid solution, and showing an anisotropy field (Hk) of not less than 4.0 KOe and a temperature stability in the range of −0.5 to +2.0 Oe/°C. in the temperature range of −20° to 120° C.

In a second aspect of the present invention, there is provided a process for producing the plate-like composite Ba-containing ferrite fine particles for magnetic recording set forth in the 1st aspect, which comprises autoclaving a suspension of an alkaline iron (III) hydroxide containing Ba ions as well as a Ni compound, a Co compound and a Ti compound in the molar ratios defined by $0.02 \leq Ni/Fe \leq 0.10$, $0.01 \leq Co/Fe \leq 0.10$ and $0.01 \leq Ti/Fe \leq 0.10$, but $0.03 \leq (Ni+Co)/Fe \leq 0.14$ and $Ti/(Ni+Co) < 1$, at a temperature of 90° to 300°, thereby producing the plate-like composite Ba-containing ferrite fine particles which contain Ni, Co and Ti; suspending the thus obtained particles in an aqueous solution containing zinc and having a pH of 4.0 to 12.0 to obtain the plate-like composite Ba-containing ferrite fine particles having a Zn hydroxide precipitated on the particle surfaces; filtering out the resultant particles; and after washing with water and drying, heat-treating the thus obtained particles at a temperature in the range of 600° to 900° C.

DETAILED DESCRIPTION OF THE INVENTION

According to the present invention, an autoclaving method of an alkaline iron (III) hydroxide suspension containing Ba ions as well as a Ni compound, a Co compound and a Ti compound in the specific ratios such that the molar ratios of Ni, Co and Ti in the plate-like composite ferrite fine particles Ba-containing are defined respectively as follows: $0.02 \leq Ni/Fe \leq 0.10$, $0.01 \leq Co/Fe \leq 0.10$, and $0.01 \leq Ti/Fe \leq 0.10$, but $0.03 \leq (Ni+Co)/Fe \leq 0.14$ and $Ti/(Ni+Co) < 1$. Especially when considering temperature stability, it is preferable to adjust the amounts of the compounds added so that the molar ratio of Ti to the sum of Ni and Co will be in the range of 0.25 to 0.70 [$0.25 \leq Ti/(Ni+Co) \leq 0.7$].

The plate-like composite Ba-containing ferrite fine particles according to the present invention have a temperature stability of −0.5 to +2.0 Oe/°C., preferably −0.5 to +1.5 Oe/°C., in the temperature range of −20° to 120° C.; a coercive force of 300 to 2,000 Oe, preferably 500 to 1,700 Oe; a magnetization of not less than 55 emu/g, preferably 56 to 65 emu/g; and an anisotropy field (Hk) of not less than 4.0 KOe, preferably not less than 4.5 KOe.

The plate-like composite Ba-containing ferrite fine particles according to the present invention, as more definitely explained in the Examples and Comparative Examples described later, are the ones which further contain Ni(II), Co(II) and Ti(IV) and are excellent in temperature stability and anisotropy field owing to a synergistic effect of Ni and Ti contained in the particles in the specified ratios and zinc present in the vicinity of the particle surface in the form of solid solution.

The zinc present in the vicinity of the particle surface thereof in the form of solid solution has an action in improving temperature stability. Further, as explained in the Examples and Comparative Examples described later, it has actions in lowering the coercive force and in controlling it to an appropriate level. Also, it contributes to increasing magnetization more effectively by a synergistic effect with Co.

Addition of an Ni compound for the purpose of improving temperature stability of plate-like composite ferrite fine particles containing Ba is disclosed in Japanese Patent Application Laid-Open (KOKAI) No. 61-156303 (1986). The disclosure of this prior publication, however, is not purposed to improve temperature stability of plate-like composite Ba-containing ferrite fine particles containing Co(II) and Ti(IV), and also, in this prior publication, Ni and Ti are added in equimolar amounts.

The alkaline suspension of the present invention is produced by reacting Fe(III) salt and Ba ions with an aqueous alkaline solution. Such an alkaline suspension has at least equivalent to the total amount of Fe(III) salt, Ba salt, Ni salt, Co salt and Ti salt, preferably 1 to 4 equivalent thereto.

As the Fe(III) salt in the present invention, iron nitrate, iron chloride, etc. are usable.

The amount (molar ratio) of Ba ion added is $0.083 \leq Ba/Fe \leq 0.125$. As the Ba ions in the present invention, barium hydroxide, barium chloride, barium nitrate and the like are usable.

The reaction temperature in the present invention is 90° to 300° C. If the temperature is lower than 90° C., it is difficult to produce plate-like composite Ba-containing ferrite particles. On the other hand, if the temperature exceeds 300° C., though the plate-like composite Ba ferrite particles can be produced, the upper limit of the reaction temperature is 300° C. in consideration of an economical efficiency and a safety of apparatus.

As the Ni compound in the present invention, a water-soluble Ni salt such as nickel chloride, nickel nitrate, nickel acetate and the like are usable.

As the Co compound in the present invention, a water-soluble Co salt such as cobalt chloride, cobalt nitrate and the like are usable.

As the Ti compound in the present invention, a water-soluble Ti salt such as titanium tetrachloride, titanyl sulfate and the like are usable.

The amounts (molar ratio) of Ni, Co and Ti compounds used in the present invention are defined as follows:

$0.02 \leq Ni/Fe \leq 0.10$, $0.01 \leq Co/Fe \leq 0.10$ and $0.01 \leq Ti/Fe \leq 0.10$, but $0.03 \leq (Ni+Co)/Fe \leq 0.14$ and $Ti/(Ni+Co) < 1$.

When the Ni/Fe molar ratio is less than 0.02, it is difficult to obtain the plate-like composite Ba-containing ferrite fine particles containing Ni, Co and Ti which are improved in temperature stability as intended in the present invention. When the Ni/Fe ratio exceeds 0.10, although temperature stability can be improved as intended in the present invention, the produced plate-like composite Ba-containing ferrite fine particles containing Ni, Co and Ti are lowered in magnetization.

When the Co/Fe molar ration is less than 0.01, the obtained plate-like composite Ba-containing ferrite fine particles containing Ni, Co and Ti are lowered in magnetization and anisotropy field. When the ratio of Co/Fe exceeds 0.10, it is difficult to obtain the plate-like composite Ba-containing ferrite fine particles containing Ni, Co and Ti which are improved in temperature stability as intended in the present invention.

When the Ti/Fe molar ratio is less than 0.01, it is difficult to obtain the plate-like composite Ba-containing ferrite fine particles containing Ni, Co and Ti which are improved in temperature stability as intended in the present invention, and when the ratio of Ti/Fe exceeds 0.10, the obtained particles are lowered in magnetization.

In case the (Ni+Co)/Fe molar ratio is less than 0.03, the coercive force of the obtained plate-like composite Ba-containing ferrite particles containing Ni, Co and Ti become higher than 2,000 Oe and as a result such particles are unsuited for use as magnetic particles for magnetic recording. When the ratio of (Ni+Co)/Fe exceeds 0.14, the coercive force of the obtained particles become lower than 300 Oe and as a result such particles are unfavorable for use as magnetic particles for magnetic recording.

In the present invention, the Ti/(Ni+Co) molar ratio should be less than 1. When this ratio exceeds 1, there can not be obtained the plate-like composite Ba-containing ferrite fine particles containing Ni, Co and Ti which are improved in temperature stability as purposed in the present invention.

In order to precipitate a Zn hydroxide in the present invention, plate-like composite Ba-containing ferrite fine particles are suspended in an aqueous solution containing zinc and having a pH of 4.0 to 12.0.

As an aqueous solution containing zinc, zinc halides such as zinc chloride, zinc bromide and zinc iodide and zinc nitrate, zinc sulfate, zinc acetate, etc. are usable.

If the pH is less than 4 or more than 12, precipitation of zinc becomes difficult.

The heat-treatment temperature in the present invention is 600° to 900° C.

If it is lower than 600° C., the amount of zinc solid solution in the vicinity of the particle surface of the plate-like composite Ba-containing ferrite fine particles is insufficient. If it exceeds 900° C., the sintering between the particles becomes prominent.

In advance of the heat-treatment in the present invention, the particle surfaces of the plate-like composite Ba-containing ferrite fine particles may be coated with an Si compound, Al compound, P compound or the like which has a sintering preventing effect.

A known flux may be used for heat-treating. As the flux, at least one selected from the group consisting of a halide of an alkali metal, a halide of an alkali earth metal, a sulfate of an alkali and a sulfate of an alkali earth metal is usable.

The amount of flux used is 10 to 200 wt % based on the fine particles heat-treated. If it is less than 10 wt %, particles are unfavorably sintered between each other during the heat-treatment. Addition of more than 200 wt % of a flux can also achieve the object of the present invention, but it is meaningless to add a flux more than necessary.

The flux is washed with at least one selected from the group consisting of water and an aqueous acid solution such as hydrochloric acid, acetic acid and nitric acid.

In the plate-like composite Ba-containing ferrite particles according to the present invention, Zn exists in the vicinity of the particle surface thereof in the form of a solid solution, having a concentration gradient of Zn with 0.2 to 5.0 wt % (calculated as Zn) through the particle.

If it is less than 0.2 wt %, the object of the present invention cannot be achieved sufficiently. Even if it exceeds 5.0 wt %, the object of the present invention is achieved, but it is meaningless to add zinc more than necessary.

The plate-like composite Ba-containing ferrite fine particles according to the present invention have a large magnetization, an appropriate coercive force and a large anisotropy field, and is excellent in temperature stability.

Particularly, since the temperature stability in the temperature range of $-20°$ C. to $120°$ C. is $-0.5$ Oe/$°$C. to $+2.0$ Oe/$°$C., preferably $-0.5$ Oe/$°$C. to $+1.5$ Oe/$°$C.; the magnetization of these particles is not less than 55 emu/g, preferably 56 to 65 emu/g; the coercive force of these particles is 300 to 2000 Oe, preferably 500 to 1700 Oe; the anisotropy field (Hk) of these particles is not less than 4.0 KOe, preferably not less than 4.5 KOe; an average particle size thereof is 0.01 to 0.3 $\mu$m, preferably 0.01 to 0.1 $\mu$m, more preferably 0.03 to 0.08 $\mu$m, still more preferably 0.03 to 0.06 $\mu$m and an aspect ratio (average particle size/lamellar thickness) is 3:1 to 15:1, the plate-like composite Ba-containing ferrite particles according to the present invention are highly suitable as plate-like composite ferrite particles for magnetic recording which are now in the strongest demand.

EXAMPLES

The present invention will be explained with reference to the following examples and comparative examples.

In the following examples and comparative examples, the average particle diameter is a value obtained from an electron micrograph.

The magnetization and the coercive force were measured in a magnetic field of 10 KOe in the powder state.

The temperature stability (Oe/$°$C.) was represented by the value obtained by dividing the difference between the coercive force at $120°$ C. and the coercive force at $-20°$ C. by the temperature difference between $120°$ C. and $-20°$ C., namely, $140°$ C.

An anisotropy field (Hk) is represented by the value obtained by a method described on from line 21 on the left to line 10 on the right of page 3433 of JOURNAL OF APPLIED PHYSICS vol. 63, No. 8 (1988).

That is, coordinates (ordinate: Wr, abscissa: 1/H) were produced by plotting the value of energy loss (Wr) [Rotational Hysteresis Loss] obtained from the torque curve which is obtained when a sample is rotated by $360°$ C. by using a torque magnetometer (Model 1600, produced by DIGITAL MEASUREMENT SYSTEM, INC.) with respect to the reciprocal: 1/H of the magnetic field (H). The inclined portion of the curve which has the largest inclination to the abscissa was taken out and the value of the point at which the extension of the inclined portion crosses the abscissa: 1/H was assumed to be the anisotropy field (Hk).

Each sample was produced by applying a kneaded mixture of plate-like composite ferrite containing Ba particles and an epoxy resin to paper.

Production of Plate-like Composite Ba-containing Ferrite Fine Particles from Aqueous Solution Examples 1 to 8

Comparative Examples 1 to 4

Example 1

An alkaline suspension of 14 mol of $FeCl_3$, 0.42 mol (equivalent to Ni/Fe=0.03 by molar ratio) of $NiCl_2$, 0.84 mol (equivalent to Co/Fe=0.06 by molar ratio) of $CoCl_2$, 0.42 mol (equivalent to Ti/Fe=0.03 by molar ratio of $TiCl_4$, 1.4 mol (equivalent to Ba/Fe=0.1 by molar ratio) of $BaCl_2 \cdot 2H_2O$ and 169 mol of NaOH was heated to $160°$ C. in an autoclave and maintained at $160°$ C. for 3 hours while being mechanically stirred, thereby producing a brown ferromagnetic precipitate.

After the autoclave was cooled to room temperature, the brown ferromagnetic precipitate was filtered out, throughly washed with water, and dried.

As a results of X-ray fluorometry and X-ray diffractometry, the obtained particles were plate-like composite Ba-containing ferrite particles containing Ni, Co and Ti in the molar ratios defined by Ni/Fe=0.03, Co/Fe=0.06 and Ti/Fe=0.03.

Examples 2 to 8, Comparative Examples 1 to 4

Plate-like composite Ba-containing ferrite fine particles were obtained in the same way as in Example 1 except for varying the kind of an aqueous ferric salt solution, the kind of an aqueous Ba salt solution, the kind and the amount of Ni compound, the kind and the amount of Co compound, the kind and the amount of Ti compound, and the reaction temperature and time.

The main production conditions and the properties of the products are shown in Table 1.

Production of Plate-like Composite Ba-containing Ferrite Fine Particles by Heat-Treating Examples 9 to 16

Comparative Examples 5 to 8

Example 9

100 g of the plate-like composite Ba-containing ferrite particles containing Ni, Co and Ti obtained in Example 1 were dispersed in 0.06 mol of an aqueous zinc chloride solution, a Zn hydroxide was precipitated on the particle surfaces at pH 9, and the thus obtained particles were filtered out, dried and then heat-treated at $850°$ C. for 1.5 hours.

The thus heat-treated particles are plate-like particles having an average particles diameter of 0.05 m from the observation through an electron microscope. As to the magnetic properties, the coercive force (Hc) was 830 Oe, the magnetization was 57.5 emu/g and the temperature dependence of the coercive force (Temperature stability) was $+1.0$ Oe/$°$C.

When these fine particles are chemically analyzed, no zinc oxide or zinc hydroxide that was to be extracted under heating in an aqueous alkaline solution was detected. As a result, it was observed that zinc had dissolved in the form of a solid solution.

Examples 10 to 16, Comparative Examples 5 to 8

Plate-like composite Ba-containing ferrite fine particles were obtained in the same way as in Example 9 except for varying the kind and the amount of Zn compound, the heat-treating temperature and time, and the kind and amount of flux.

The main production conditions and the properties of the products are shown in Table 2.

TABLE 1

Production of Plate-like Composite Ferrite Containing Ba Fine Particles From Aqueous Solution

| Examples and Comparative Examples | Aqueous Ferric Salt Solution Kind | Aqueous Ba Salt Solution Kind | Amount (mol) | Ni Compound Kind | Ni/Fe (Molar ratio) | Co Compound Kind | Co/Fe (Molar ratio) |
|---|---|---|---|---|---|---|---|
| Example 1 | FeCl₃ | BaCl₂ | 1.4 | NiCl₂ | 0.03 | CoCl₂ | 0.06 |
| Example 2 | FeCl₃ | Ba(NO₃)₂ | 1.4 | NiCl₂ | 0.09 | Co(NO₃)₂ | 0.03 |
| Example 3 | Fe(NO₃)₃ | Ba(OH)₂ | 1.4 | Ni(NO₃)₂ | 0.03 | " | 0.09 |
| Example 4 | " | BaCl₂ | 1.4 | " | 0.06 | " | 0.06 |
| Example 5 | " | " | 1.4 | " | 0.04 | " | 0.04 |
| Example 6 | FeCl₃ | " | 1.4 | NiCl₂ | 0.03 | CoCl₂ | 0.06 |
| Example 7 | " | " | 1.4 | " | 0.03 | " | 0.06 |
| Example 8 | Fe(NO₃)₃ | Ba(NO₃)₂ | 1.4 | NiCl₂ | 0.02 | Co(NO₃) | 0.03 |
| Comparative Example 1 | FeCl₃ | BaCl₂ | 1.4 | NiCl₂ | 0.01 | CoCl₂ | 0.06 |
| Comparative Example 2 | " | " | 1.4 | " | 0.02 | " | 0.12 |
| Comparative Example 3 | Fe(NO₃)₂ | " | 1.4 | Ni(NO₃)₂ | 0.04 | Co(NO₃)₂ | 0.06 |
| Comparative Example 4 | " | " | 1.4 | NiCl₂ | 0.03 | " | 0.03 |

| Examples and Comparative Examples | Ti Compound Kind | Ti/Fe (Molar ratio) | Ti/(Ni + Co) | Reaction Temperature (°C) | Reaction time (hr) | Ni/Fe (Molar ratio) | Co/Fe (Molar ratio) | Ti/Fe (Molar ratio) |
|---|---|---|---|---|---|---|---|---|
| Example 1 | TiCl₄ | 0.03 | 0.33 | 160 | 3.0 | 0.03 | 0.06 | 0.03 |
| Example 2 | " | 0.03 | 0.25 | 160 | 3.0 | 0.09 | 0.03 | 0.03 |
| Example 3 | " | 0.03 | 0.25 | 160 | 5.0 | 0.03 | 0.09 | 0.03 |
| Example 4 | " | 0.08 | 0.67 | 200 | 3.0 | 0.06 | 0.06 | 0.08 |
| Example 5 | TiOSO₄ | 0.02 | 0.25 | 200 | 3.0 | 0.04 | 0.04 | 0.02 |
| Example 6 | TiCl₄ | 0.03 | 0.33 | 90 | 3.0 | 0.03 | 0.06 | 0.03 |
| Example 7 | " | 0.03 | 0.33 | 250 | 3.0 | 0.03 | 0.06 | 0.03 |
| Example 8 | TiOSO₄ | 0.025 | 0.50 | 160 | 3.0 | 0.02 | 0.03 | 0.025 |
| Comparative Example 1 | TiCl₄ | 0.03 | 0.25 | 160 | 3.0 | 0.01 | 0.06 | 0.03 |
| Comparative Example 2 | " | 0.03 | 0.21 | 160 | 3.0 | 0.02 | 0.12 | 0.03 |
| Comparative Example 3 | " | 0.005 | 0.05 | 200 | 3.0 | 0.04 | 0.06 | 0.005 |
| Comparative Example 4 | " | 0.08 | 1.33 | 200 | 3.0 | 0.03 | 0.03 | 0.08 |

TABLE 2

| Examples and Comparative Examples | Starting Materials (Example No. and Comparative Example No.) | Zn Compound Kind | Amount (mol) | Heat-treatment Temperature (°C) | Time (hour) | Flux Kind | Amount (g) |
|---|---|---|---|---|---|---|---|
| Example 9 | Example 1 | ZnCl₂ | 0.06 | 850 | 1.5 | — | — |
| Example 10 | Example 2 | " | 0.06 | 850 | 1.5 | NaCl | 100 |
| Example 11 | Example 3 | " | 0.06 | 850 | 1.5 | NaCl, BaCl₂ | 80,20 |
| Example 12 | Example 4 | " | 0.04 | 900 | 1.5 | BaCl₂ | 100 |
| Example 13 | Example 5 | Zn(NO₃)₂ | 0.06 | 850 | 1.0 | — | — |
| Example 14 | Example 6 | (CH₃COO)₂Zn | 0.06 | 850 | 1.0 | KCl | 150 |
| Example 15 | Example 7 | ZnCl₂ | 0.07 | 700 | 2.0 | NaCl | 100 |
| Example 16 | Example 8 | " | 0.05 | 800 | 1.0 | — | — |
| Comparative Example 5 | Comparative Example 1 | ZnCl₂ | 0.06 | 850 | 1.5 | — | — |
| Comparative Example 6 | Comparative Example 2 | " | 0.04 | 800 | 1.5 | — | — |
| Comparative Example 7 | Comparative Example 3 | " | 0.06 | 850 | 1.5 | — | — |
| Comparative Example 8 | Comparative Example 4 | Zn(NO₃)₂ | 0.05 | 800 | 1.5 | NaCl | 100 |

| Examples and Comparative Examples | Ni/Fe (Molar ratio) | Co/Fe (Molar ratio) | Ti/Fe (Molar ratio) | Zn (wt %) | Average diameter (μm) | Coercive force (Hc) (Oe) | Magnetization ($\sigma s$) (emu/g) | Temperature stability (Oe/°C) | Anisotropy field (KOe) |
|---|---|---|---|---|---|---|---|---|---|

TABLE 2-continued

| | | | | | | | | | |
|---|---|---|---|---|---|---|---|---|---|
| Example 9 | 0.03 | 0.06 | 0.03 | 3.0 | 0.05 | 830 | 57.5 | −1.0 | 4.9 |
| Example 10 | 0.09 | 0.03 | 0.03 | 3.0 | 0.05 | 720 | 61.0 | −0.2 | 4.5 |
| Example 11 | 0.03 | 0.09 | 0.03 | 3.0 | 0.05 | 600 | 64.0 | +1.9 | 4.8 |
| Example 12 | 0.06 | 0.06 | 0.08 | 2.0 | 0.08 | 650 | 60.5 | +0.4 | 4.9 |
| Example 13 | 0.04 | 0.04 | 0.02 | 3.0 | 0.05 | 1220 | 56.4 | +0.8 | 5.1 |
| Example 14 | 0.03 | 0.06 | 0.03 | 3.0 | 0.04 | 820 | 62.5 | −1.6 | 4.9 |
| Example 15 | 0.03 | 0.06 | 0.03 | 3.5 | 0.05 | 750 | 63.5 | −1.5 | 4.9 |
| Example 16 | 0.02 | 0.03 | 0.025 | 2.5 | 0.05 | 1550 | 57.0 | −1.1 | 5.5 |
| Comparative Example 5 | 0.01 | 0.06 | 0.03 | 3.0 | 0.05 | 980 | 57.3 | +2.5 | — |
| Comparative Example 6 | 0.02 | 0.12 | 0.03 | 2.0 | 0.06 | 630 | 58.5 | +3.2 | — |
| Comparative Example 7 | 0.04 | 0.06 | 0.005 | 3.0 | 0.06 | 850 | 56.9 | +2.9 | — |
| Comparative Example 8 | 0.03 | 0.03 | 0.08 | 2.5 | 0.10 | 1140 | 54.2 | +2.3 | — |

What is claimed is:

1. Plate-like composite Ba-containing ferrite fine particles for magnetic recording, containing Ni, Co and Ti in the molar ratios defined by $0.02 \leq Ni/Fe \leq 0.10$, $0.01 \leq Co/Fe \leq 0.10$ and $0.01 \leq Ti/Fe \leq 0.10$, provided that $0.03 \leq (Ni+Co)/Fe \leq 0.14$ and $Ti/(Ni+Co) < 1$, and having 0.2 to 5.0 wt % of Zn as a solid solution close to the particle surface, said particles showing a temperature dependence of coercive force in the range of −0.5 to +2.0 Oe/°C. in the temperature range of −20° to 120° C., and an anisotropy field of not less than 4.0 KOe, and prepared by a process comprising:

(a) autoclaving a suspension of an alkaline iron (III) hydroxide containing Ba ions as well as a Ni compound, a Co compound and a Ti compound in the molar ratios defined by $0.02 \leq Ni/Fe \leq 0.10$, $0.01 \leq Co/Fe \leq 0.10$ and $0.01 \leq Ti/Fe \leq 0.10$, but $0.03 \leq (Ni+Co)/Fe \leq 0.14$ and $Ti/(Ni+Co) < 1$, at a temperature of 90° to 300° C., thereby producing plate-like composite Ba-containing ferrite fine particles which contain Ni, Co and Ti;

(b) suspending the thus obtained particles in an aqueous solution containing zinc and having a pH of 4.0 to 12.0 to obtain plate-like composite Ba-containing ferrite fine particles having a Zn hydroxide precipitated on the particle surfaces; filtering out the resultant particles; and, after washing with water and drying, (c) heat-treating the thus obtained particles at a temperature in the range of 600° to 900° C.

2. The plate-like composite Ba-containing ferrite fine particles according to claim 1, wherein the temperature dependence of coercive force in the temperature range of −20° to 120° C. is in the range of −0.5 to +1.5 Oe/°C.

3. The plate-like composite Ba-containing ferrite fine particles according to claim 1 which have a coercive force of 300 to 2,000 Oe and a magnetization of not less than 55 emu/g.

4. The plate-like composite Ba-containing ferrite fine particles according to claim 1 which have an average particle size of 0.01 to 0.3 μm.

5. The plate-like composite Ba-containing ferrite fine particles according to claim 1, wherein the anisotropy field is not less than 4.5 KOe.

6. The plate-like composite Ba-containing ferrite fine particles according to claim 1, wherein the Ba content (molar ratio) in the suspension is $0.083 \leq Ba/Fe \leq 0.125$.

* * * * *